United States Patent Office 3,196,040
Patented July 20, 1965

3,196,040
PROCESS FOR COATING REGENERATED CELLULOSE FILM AND RESULTING PRODUCT
William Paul Kane, Bon Air, Va., assignor to E. I. du Pont de Nemours and Company, Wilmington, Del., a corporation of Delaware
No Drawing. Filed Nov. 2, 1961, Ser. No. 149,512
15 Claims. (Cl. 117—76)

This invention relates to the manufacture of polymeric, non-fibrous, flexible films such as cellulosic films, particularly suited for conversion to bags, containers and similar packages. More particularly, it relates to the manufacture of such films coated with polymers of mono-ethylenically unsaturated hydrocarbons.

This application is a continuation-in-part of my co-pending U.S. patent application Serial Number 737,535, filed May 26, 1958, which, in turn, was a continuation-in-part of U.S. patent application Serial No. 660,464, filed May 21, 1957, now abandoned.

For several reasons, films composed of the polymers derived from the mono-ethylenically unsaturated hydrocarbons (polyethylene, polypropylene and polystyrene) have never seriously encroached on the market for packaging films such as regenerated cellulose film. In thicknesses necessary for packaging films, these polyhydrocarbon films are limp and tend to exhibit haziness where transparency, clarity and high gloss are desired. Their limpness and thermoplasticity make the films difficult to handle in standard packaging machinery. The surfaces of such films do not retain printed information satisfactorily.

These polymeric films do exhibit outstanding flexibility, tear strength, resistance to deterioration by greases and oils, abrasion resistance and low moisture permeability. These properties have made the polyhydrocarbons, particularly polyethylene, useful in some packaging operations and potentially useful as a coating for other non-fibrous films such as regenerated cellulose film. But as a coating, the polyhydrocarbons have never realized their full potentiality. The reason—the adhesion between the polyhydrocarbons and films such as regenerated cellulose film is so poor as to render the combination practically useless. Various adhesion promoters have been suggested. When high relative humidity conditions are encountered, most of them fail. Other adhesion promoters, although improving adhesion, tend to add a blush or haze problem to the manufacturer's problems.

It is an object of the present invention to provide a polyhydrocarbon composition which, when applied as a coating, will adhere tenaciously to a variety of non-fibrous, flexible base sheets even under high relative humidity conditions. Another object is to provide a final film in which the desirable properties of the base sheet and the desirable properties of the polyhydrocarbons are retained. Other objects will appear hereinafter.

The objects are accomplished by providing a non-fibrous, flexible base sheet such as regenerated cellulose film coated with a composition comprising essentially 90–99% of a polymer of a mono-ethylenically unsaturated hydrocarbon such as polyethylene and 1–10% of a hydrocarbon having a plurality of -N=C=X groups attached thereto wherein X is a chalcogen (Journal American Chemical Society, 63, p. 892 (1941)) of atomic weight less than 35 such as the diisocyanates and diisothiocyanates.

The term "polyhydrocarbon," unless otherwise modified, as used throughout the specification, is intended to be limited to the polymers of mono-ethylenically unsaturated alpha olefins and/or copolymers thereof. Some of the most useful polymers include polyethylene, polypropylene, polyisobutylene, polymethylene, polynorbornlyene, polystyrene and polymethylstyrene.

The polyethylene used for the purpose of this invention is the normally solid, crystalline polymer of the formula: $(CH_2)_x$. It is formed by the polymerization of ethylene in any known manner, cf., United States Patent No. 2,153,553.

The poly-N=C=X compounds include the polyisocyanates, polyisothiocyanates and mixed isocyanates-isothiocyanates having at least one of each. For convenience of disclosure, the invention will be discussed largely in terms of the polyisocyanates, specifically the diisocyanates.

The composition, in condition suitable for coating, is most easily prepared by dissolving the solids, i.e., the polyhydrocarbon and the polyisocyanate in a common volatile organic solvent, e.g., toluene, or in a mixture of solvents. The polyhydrocarbon should comprise from 90–99% by weight of the solids content of the coating composition and the polyisocyanate should comprise from 1–10% of the solids content of the composition. Concentrations of the polyisocyanate in excess of 10% give cloudy coatings which indicate incompatability between the polymers above this level. Such compositions also tend to remain tacky and are difficult to dry. If less than 1% of the polyisocyanate is used, the adhesion is poor and the advantageous results of this invention are not realized. It is to be understood, of course, that any other suitable method for combining the essential ingredients of the composition may be employed, such as melt mixing, milling, dispersing in aqueous medium (water), etc. The composition, however prepared, may be coated on one or both sides of the non-fibrous base sheet by dip, spray, melt extrusion, or any other convenient coating expedient.

Because of the wide use and commercial importance of regenerated cellulose film as a wrapping material, the description of the invention will mostly concern coating regenerated cellulose film. The regenerated cellulose film used in the invention may have been prepared by the viscose process, the cuprammonium process or other processes.

Although the polyhydrocarbon coating compositions of this invention adhere strongly to the non-fibrous base sheets without the necessity of an intermediate anchor coating, or the incorporation in the base sheet of an agent which functions to bond the protective coating to the base sheet, the application of the coating compositions described herein to base films modified by the addition of an intermediate anchor coat or agent, is not to be regarded as outside the scope of this invention. In the case of regenerated cellulose base sheets, in particular, it is of advantage, especially when the coated sheet is to be subjected to conditions of high moisture, to employ any of the known means for improving coating adhesion, e.g., the application of an anchor sub-coat as disclosed in Jebens U.S. Patent 2,280,829, or by impregnating the base sheet prior to coating with an anchoring agent of thermosetting resin such as a urea-aldehyde resin, phenol-formaldehyde resin, ketone-aldehyde resin, amine modified urea-aldehyde resin, alcohol modified urea-aldehyde resin, etc., disclosed, for example, in Charch and Bateman U.S. Patent 2,159,007; Ellis U.S. Patent 2,523,868; and Chapman U.S. Patent 2,533,557.

The invention will be more clearly understood by referring to the descriptive material and the examples which follow. Unless otherwise stated, all parts and percentages given in the examples are by weight. It should be understood that the examples, although illustrating specific embodiments of the present invention, should not be considered limitative.

For convenience, abbreviations and commercial names have been used in the tables accompanying the examples.

PE represents polyethylene, PS, polystyrene; PP, polypropylene; S/IB, a copolymer from 50% styrene and 50% isobutylene; TDI, 2,4-toluene diisocyanate; MDI, 4,4'-diphenylmethane diisocyanate; and PDI, p-phenylene diisocyanate.

EXAMPLE I

A solution was prepared by dissolving 97 parts of polyethylene and 3 parts of toluene diisocyanate in 400 parts of toluene at 100°–105° C. A base film of regenerated cellulose approximately 1 mil thick was unwound from a roll, passed over a tension roll, then over a guide roll into a tank containing the coating solution. The coated film was then passed between two "doctor" rolls which served to smooth the coating and to regulate its thickness. The coated film was dried in a tower maintained at a temperature between 145° C. and 185° C. The coating weight was approximately 4 grams/square meter.

As a control, 100 parts of polyethylene in 400 parts of toluene was used. The coating procedure was identical to that described above.

In table 1 the peel heat-seal strength and the adhesion in direct contact with water (anchorage) are compared for the 2 coated films. The details for measuring these properties are as follows:

Peel heat-seal strength is a measure of the strength of the bond between two films when they are sealed together by heat and pressure. A piece of the coated film 4″ x 10″ with the grain running in the long direction is cut into two pieces 4″ x 5″. The two pieces are superimposed so that opposite surfaces are in contact. The two pieces of superimposed film are then sealed together at each end at right angles to the grain. A ¾″ wide sealing bar heated to a temperature of 130° C. contacts the ends for 2 seconds at a pressure of 20 p.s.i. The sealed sheets are then cut in half at right angles to the grain. From the center of the four resulting pieces 1½″ wide strips parallel to the grain are cut. The four sets of strips are then conditioned for 48 hours at 34° C. and 81% relative humidity. They are tested by opening each set of strips at the free ends, placing them in a Suter testing machine and pulling them apart. The force in grams required to separate the seal after it has been ruptured is the peel heat-seal strength.

Anchorage refers to the adhesion of the coating to the base film when in direct contact with water. Samples of the coated film are suspended in water at 25° C. for 60 hours and then graded approximately as follows:

Grade 1—No blisters
Grade 2—Few blisters
Grade 3—Decided blistering
Grade 4—Coating sloughs off at blistered or unblistered portions Table 1.—Properties of coated regenerated cellulose film of Example I compared to a control

| Example | Composition (percent by wt.) | Peel Heat-Seal strength | Anchorage |
| --- | --- | --- | --- |
| I | 97PE–3TDI | 100 | 3 |
| Control | 100PE | 20 | 4 |

EXAMPLES II–V

Example I was repeated except that the gel regenerated cellulose film was first impregnated (in the softener bath) with an anchoring agent, a guanidine-urea-formaldehyde resin. The resin had been obtained by reacting together about 0.04 mole of guanidine nitrate, about 2.3 moles of formaldehyde and about 1 mole of urea. The preparation of the resin and the manner of impregnating the regenerated cellulose film are substantially as described in Example I of U.S. Patent No. 2,533,557.

The resulting film, containing 0.3% by weight of resin based on the weight of the cellulose, was coated with solutions in 400 parts of toluene of the following ingredients: For Example II, 97PE and 3TDI; Example III, 95PE and 5TDI; Example IV, 93PE and 7TDI; Example V, 90PE and 10TDI; Control, 100PE. The physical properties are compared in Table 2.

Table 2.—Properties of coated, resin-impregnated regenerated cellulose films of Examples II–V compared to a control

| Example | Composition (Percent by wt.) | Peel Heat-Seal Strength | Anchorage |
| --- | --- | --- | --- |
| II | 97PE–3TDI | 140 | 2 |
| III | 95PE–5TDI | 175 | 2 |
| IV | 93PE–7TDI | 210 | 1 |
| V | 90PE–10TDI | 200 | 1 |
| Control | 100PE | 35 | 4 |

EXAMPLE VI

A resin-impregnated film (0.3% guanidine-urea-formaldehyde resin) similar to that used in Examples II–V was coated in the manner previously described with solutions of polystyrene in 600 parts of toluene. In Example VI, 95 parts PS and 5 parts MDI were used and in the control, the MDI was omitted.

Table 3.—Properties of coated, resin-impregnated regenerated cellulose film of Example VI compared to a control

| Example | Composition (Percent by wt.) | Peel Heat-Seal Strength | Anchorage |
| --- | --- | --- | --- |
| VI | 95PS–5MDI | 250 | 2 |
| Control | 100PS | 25 | 4 |

EXAMPLE VII

A resin-impregnated film (0.3% guanidine-urea-formaldehyde resin) similar to that used in Examples II–VI was coated in the manner previously described with solutions of a polymer prepared using 50% styrene and 50% isobutylene in 900 parts of toluene. In Example VII, 98 parts S/IB and 2 parts TDI were used and in the control, the TDI was omitted. The properties are compared in Table 4.

Table 4.—Properties of coated, resin-impregnated regenerated cellulose film of Example VII compared to a control

| Example | Composition (Percent by wt.) | Peel Heat-Seal Strength | Anchorage |
| --- | --- | --- | --- |
| VII | 98S/IB–2TDI | 150 | 2 |
| Control | 100S/IB | 30 | 4 |

EXAMPLE VIII

A regenerated cellulose film similar to that used in Example I (not resin-impregnated) was coated in the manner previously described with solutions of polypropylene in 400 parts of toluene. In Example VIII, 95 parts PP and 5 parts TDI were used and in the control, the TDI was omitted. The properties are compared in Table 5.

*Table 5.—Properties of coated regenerated cellulose film of Example VIII compared to a control*

| Example | Composition (Percent by wt.) | Peel Heat-Seal Strength | Anchorage |
|---|---|---|---|
| VIII | 95PP-5TDI | 150 | 3 |
| Control | 100PP | 20 | 4 |

The importance of the poly-N=C=X (X being a chalcogen of atomic weight less than 35) compounds in the polyhydrocarbon coating composition is illustrated in the foregoing examples. Adhesion, particularly under conditions of high humidity, is improved as much as ten-fold over cases where the poly-N=C=X compound is omitted.

The most useful poly-N=C=X compounds, the di-N=C=X compounds, may be depicted by the general formula:

X=C=N—Y—N=C=X where X is a chalcogen of atomic weight less than 35 and Y is a divalent hydrocarbon radical. These compounds include polymethylene diisocyanates and diisothiocyanates such as ethylene diisocyanate, trimethylene diisocyanate, dodecamethylene diisocyanate, hexamethylene diisocyanate, tetramethylene dissocyanate, pentamethylene diisocyanate, and the corresponding diisothiocyanates; alkylene diisocyanates and diisothiocyanates such as propylene-1,2-diisocyanate, 2,3-dimethyltetramethylene diisocyanate and diisothiocyanates, butylene-1,2-diisocyanate, butylene-1,3-diisothiocyanate, and butylene-1,3-diisocyanate; alkylidene diisocyanates and diisothiocyanates such as ethylidene diisocyanate and heptylidene diisothiocyanate; cycloalkylene diisocyanates and diisothiocyanates such as 1,4-diisocyanatocyclohexane, cyclopentylene-1,3-diisocyanate, and cyclohexylene-1,2-diisothiocyanate; aromatic diisocyanates and diisothiocyanates such as m-phenylene diisothiocyanate, p-phenylene diisocyanate, p-phenylene diisothiocyanate, 1-methylphenylene-2,4-diisocyanate, naphthylene-1,4-diisocyanate, o,o'-toluene diisocyanate, diphenyl-4,4'-diisothiocyanate and diisocyanate, benzene-1,2,4-triisothiocyanate, 5-nitro-1,3-phenylene diisocyanate, xylylene-1,4 diisocyanate, xylylene-1,3 diisocyanate, 4,4'-diphenylenemethane diisocyanate, 4,4'-diphenylenepropane diisocyanate and xylylene-1,4 diisothiocyanate; aliphatic-aromatic diisocyanates and diisothiocyanates such as phenylethylene diisocyanate. In fact, any diisocyanate, diisothiocyanate, or mixed isocyanate-isothiocyanate of the general formula XCNYNCX, in which X is oxygen or sulfur and Y is a divalent hydrocarbon radical, will give improved products according to the present invention. This invention is not, however, limited to di-N=C=X compounds since organic compounds having a higher number of -N=C=X groups may be employed including 1,2,4-benzene triisothiocyanate and butane-1,2,2-triisocyanate.

While the invention contemplates the use of the polyhydrocarbon and the poly-N=C=X compound as the essential constituents of the coatings, other ingredients may be added. The addition of pigments, dyes, delusterants, fillers, binders, plasticizers, etc., is therefore understood to be within the purview of this invention.

The compositions of the invention are preferably applied from a solution in an inert solvent. The solvent is preferably anhydrous, although this is not absolutely necessary. Hydrocarbons such as benzene, toluene, xylene or petroleum fractions are preferred solvents. Halogenated hydrocarbons, ethers, and tertiary amines may also be used.

Various procedures may be used to coat the non-fibrous, flexible base sheet. The sheet may be dipped into the coating solution or the solution may be sprayed, brushed, etc., on one or both sides of the sheet. The coated sheet is then permitted to dry by a step in which the solvent in the coating solution is driven off, usually in the case of most solvents by exposure to elevated temperatures.

It is believed that the improvement in adhesion is obtained by a complex reaction and the degree of improvement depends upon the reactivity of the polymers. The improvement is probably due to chemical and physical bonding. To what extent the improvement is due to chemical bonding and to what extent it is due to physical forces is not known.

The presence of water in the polyhydrocarbon seems to have little or no effect in the invention. Polyhydrocarbons which have been dried prior to incorporation in the coating composition are, surprisingly, no more effective in improving adhesion at high humidities than the polyhydrocarbons which have not been dried.

The coated regenerated cellulose films prepared in accordance with the present invention are useful in the packaging of foods, cigarettes, hardware, etc., in the preparation of adhesive and sound tapes, etc. In short, the coated films are useful wherever the base films or the base films coated with polyhydrocarbon coatings have been used heretofore.

As many widely different embodiments may be made without tdeparting from the spirit and scope of this invention, it is understood that the invention is not limited except as defined in the appended claims.

What is claimed is:

1. A regenerated cellulose film having at least one surface coated with a composition consisting essentially of 90–99% of a polyhydrocarbon selected from the group consisting of polyethylene, polypropylene, polystyrene and a copolymer obtained from 50% styrene and 50% isobutylene and 1–10% of a hydrocarbon having a plurality of -N=C=X groups attached thereto wherein X is a chalcogen of atomic weight less than 35, said -N=C=X groups being connected by a divalent hydrocarbon radical.

2. A coated regenerated cellulose film as in claim 1 wherein said polyhydrocarbon is polyethylene.

3. A coated regenerated cellulose film as in claim 1 wherein said polyhydrocarbon is polypropylene.

4. A coated regenerated cellulose film as in claim 1 wherein said polyhydrocarbon is polystyrene.

5. A coated regenerated cellulose film as in claim 1 wherein said polyhydrocarbon is a copolymer obtained from 50% styrene and 50% isobutylene.

6. A coated regenerated cellulose film as in claim 1 wherein the poly-N=C=X compound is a diisocyanate.

7. A coated regenerated cellulose film as in claim 1 wherein the poly-N=C=X compound is 2,4-toluene diisocyanate.

8. A coated regenerated cellulose film as in claim 1 wherein the poly-N=C=X compound is 4,4'-diphenylmethane diisocyanate.

9. A coated regenerated cellulose film as in claim 1 wherein the poly-N=C=X compound is a p-phenylene diisocyanate.

10. A regenerated cellulose film having at least one surface coated with a composition consisting essentially of 90–99% of polyethylene and 1–10% of 2,4-toluene diisocyanate.

11. A regenerated cellulose film impregnated with a thermo-setting resin selected from the group consisting of a urea-aldehyde resin, a phenol-formaldehyde resin, a ketone-aldehyde resin, an amine modified urea-aldehyde resin and an alcohol modified urea-aldehyde resin having at least one surface coated with a composition consisting essentially of 90–99% of a polyhydrocarbon selected from the group consisting of polyethylene, polypropylene, polystyrene and a copolymer obtained from 50% styrene and 50% isobutylene and 1–10% of a hydrocarbon having a plurality of -N=C=X groups attached thereto wherein X is a chalcogen of atomic weight less than 35, said -N=C=X groups being connected by a divalent hydrocarbon radical.

12. A regenerated cellulose film as in claim 11 wherein the thermo-setting resin is a guanidine-urea-formaldehyde resin.

13. A regenerated cellulose film impregnated with a thermo-set resin as in claim 11 having at least one surface coated with a composition consisting essentially of 90–99% of polyethylene and 1–10% of 2,4-toluene diisocyanate.

14. A process for coating regenerated cellulose film which comprises dissolving 90–99% of a polyhydrocarbon selected from the group consisting of polyethylene, polypropylene, polystyrene and a copolymer obtained from 50% styrene and 50% isobutylene and 1–10% of a hydrocarbon having a plurality of -N=C=X groups attached thereto wherein X is a chalcogen of atomic weight less than 35, said -N=C=X groups being connected by a divalent hydrocarbon radical, in a volatile organic solvent to form a solution; coating at least one surface of said regenerated cellulose film with said solution; and driving off the solvent from the coating to provide a coating having substantially the properties of said polyhydrocarbon.

15. A process as in claim 14 wherein the volatile organic solvent is toluene.

References Cited by the Examiner
UNITED STATES PATENTS

| | | | |
|---|---|---|---|
| 2,533,557 | 12/50 | Chapman | 117—73 XR |
| 2,726,171 | 12/55 | Morf | 117—76 |
| 2,876,067 | 3/59 | Nagel et al. | |
| 2,911,321 | 11/59 | Herrmann et al. | 117—76 |
| 2,953,482 | 9/60 | Scherber. | |
| 3,027,343 | 3/62 | Kane | 117—138.8 XR |

WILLIAM D. MARTIN, *Primary Examiner.*

RICHARD D. NEVIUS, *Examiner.*